(12) United States Patent
Hong et al.

(10) Patent No.: US 11,629,216 B2
(45) Date of Patent: Apr. 18, 2023

(54) POLYHYDRIC PHENOL RESIN, GLYCIDYL ETHER OF POLYHYDRIC PHENOL RESIN, AND USES THEREOF

(71) Applicant: CHANG CHUN PLASTICS CO., LTD., Taipei (TW)

(72) Inventors: Chian Wen Hong, Taipei (TW); Sung-Kuang Chung, Taipei (TW); An-Pang Tu, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 0 days.

(21) Appl. No.: 17/577,517

(22) Filed: Jan. 18, 2022

(65) Prior Publication Data
US 2022/0306794 A1 Sep. 29, 2022

(30) Foreign Application Priority Data
Mar. 29, 2021 (TW) .................................. 110111383

(51) Int. Cl.
| | | |
|---|---|---|
| C08G 8/12 | (2006.01) | |
| B32B 15/20 | (2006.01) | |
| C08G 59/06 | (2006.01) | |
| C08G 59/40 | (2006.01) | |
| B32B 5/02 | (2006.01) | |
| B32B 5/26 | (2006.01) | |
| B32B 15/14 | (2006.01) | |
| B01J 20/281 | (2006.01) | |
| G01N 30/72 | (2006.01) | |
| G01N 30/74 | (2006.01) | |
| G01N 30/02 | (2006.01) | |

(52) U.S. Cl.
CPC .................. *C08G 8/12* (2013.01); *B32B 5/02* (2013.01); *B32B 5/26* (2013.01); *B32B 15/14* (2013.01); *B32B 15/20* (2013.01); *C08G 59/063* (2013.01); *C08G 59/4021* (2013.01); *B32B 2260/021* (2013.01); *B32B 2260/046* (2013.01); *B32B 2262/101* (2013.01); *B32B 2307/204* (2013.01); *B32B 2307/3065* (2013.01); *G01N 30/482* (2013.01); *G01N 30/7206* (2013.01); *G01N 30/74* (2013.01); *G01N 2030/027* (2013.01)

(58) Field of Classification Search
CPC ..... Y10T 428/31511; Y10T 428/31515; Y10T 428/31522; Y10T 428/31529; Y10T 428/31678; Y10T 428/31688; Y10T 428/28; Y10T 428/2804; Y10T 428/2809; Y10T 428/2848; Y10T 428/2852; Y10T 428/287; Y10T 428/2874; B32B 7/00; B32B 7/04; B32B 7/12; B32B 15/00; B32B 15/04; B32B 15/08; B32B 15/092; B32B 15/098; B32B 15/20; B32B 27/00; B32B 27/06; B32B 27/08; B32B 27/16; B32B 27/18; B32B 27/36; B32B 27/38; B32B 27/42; B32B 231/12; B32B 2311/12; B32B 2363/00
USPC ....... 428/413, 414, 416, 418, 457, 460, 343, 428/344, 345, 354, 355 R, 355 EP, 428/355 AK; 523/400; 528/86–124, 528/212–219
See application file for complete search history.

(56) References Cited

U.S. PATENT DOCUMENTS 4,828,958 A 5/1989 Hayase et al.

FOREIGN PATENT DOCUMENTS

| CN | 102942432 A | 2/2013 | |
|---|---|---|---|
| JP | S4875694 U | 9/1973 | |
| JP | S6166709 A | 4/1986 | |
| JP | H08165328 A | 6/1996 | |
| JP | 2010235819 A | 10/2010 | |
| JP | 2012167141 A * | 9/2012 | |
| JP | 2012167142 A * | 9/2012 | |
| JP | 5320130 B2 * | 10/2013 | |
| JP | 2015187190 A * | 10/2015 | |
| MY | 157418 A * | 6/2016 | ............. C08G 59/08 |
| SG | 188247 A1 | 4/2013 | |
| SG | 11202012017 A1 * | 1/2021 | ............. C08G 59/38 |
| TW | 201809123 A | 3/2018 | |
| WO | WO-2013125620 A1 * | 8/2013 | ............. C08G 59/08 |
| WO | WO-2019240079 A1 * | 12/2019 | ............. C08G 59/38 |

OTHER PUBLICATIONS

Machine translation (Espacenet) of JP 5,320,130 B2. Translated Aug. 3, 2022. (Year: 2022).*
Machine translation (Espacenet) of JP 2015-187190 A. Translated Aug. 3, 2022. (Year: 2022).*
Machine translation (Espacenet) of JP 2012-167142 A. Translated Jan. 18, 2023. (Year: 2023).*
Machine translation (Espacenet) of JP 2012-167141 A. Translated Jan. 18, 2023. (Year: 2023).*
Machine translation (Espacenet) of WO 2013/125620 A1. Translated Jan. 18, 2023. (Year: 2023).*
Notice of Allowance corresponding to TW Application No. 110111383; dated Nov. 5, 2021.
TW Office Action corresponding to TW Application No. 110111383; dated Jun. 15, 2021.
EPO Extended European Search Report for EP Application No. 22153291.4; dated Jul. 5, 2022.

* cited by examiner

*Primary Examiner* — Maria V Ewald
*Assistant Examiner* — Ethan A. Utt
(74) *Attorney, Agent, or Firm* — Cantor Colburn LLP

(57) ABSTRACT

A polyhydric phenol resin is provided. The polyhydric phenol resin comprises a polyhydric phenol resin component and a first component. When the polyhydric phenol resin is characterized in a high-performance liquid chromatography (HPLC), the first component is eluted at a retention time ranging from 27.1 minutes to 28.0 minutes, and based on the total area of the chromatographic peaks of the polyhydric phenol resin, the area percentage of the chromatographic peak of the first component at the corresponding retention time in the spectrum ranges from 1.0% to 20%.

18 Claims, No Drawings

POLYHYDRIC PHENOL RESIN, GLYCIDYL ETHER OF POLYHYDRIC PHENOL RESIN, AND USES THEREOF

CROSS REFERENCE TO RELATED APPLICATIONS

The present invention claims priority under 35 U.S.C. § 119 to Taiwan Patent Application No. 110111383 filed on Mar. 29, 2021, the entire content of which is incorporated herein by reference.

BACKGROUND OF THE INVENTION

Field of the Invention

The present invention provides a polyhydric phenol resin, a glycidyl ether of polyhydric phenol resin, and uses thereof.

Descriptions of the Related Art

Epoxy resins are widely used in the semiconductor industry as circuit board material; they are liquid at room temperature, have good workability, and can easily be mixed with hardeners and additives. However, conventional epoxy resins are insufficient in thermal resistance and water absorption, necessitating further modifications to provide the required low water absorption (high moisture resistance), high thermal resistance, high flame retardance, and excellent dielectric properties of circuit boards.

It is known that styrene can be used to modify an epoxy resin to improve the moisture resistance of the epoxy resin. However, the by-products (e.g., styrene oligomers) generated during the modification would adversely affect the thermal resistance and flame retardance of the epoxy resin. Thus, there is a need for an epoxy resin with low water absorption, high thermal resistance, high flame retardance, and excellent dielectric properties.

SUMMARY OF THE INVENTION

Given the above, the present invention provides a polyhydric phenol resin, which comprises a specific amount of styrene oligomers and is capable of providing a glycidyl ether that can impart low water absorption, high thermal resistance, high flame retardance, and excellent dielectric properties to the electronic material prepared therefrom.

Thus, an objective of the present invention is to provide a polyhydric phenol resin, which comprises a polyhydric phenol resin component and a first component, wherein when the polyhydric phenol resin is characterized by high-performance liquid chromatography (HPLC), the first component is eluted at a retention time ranging from 27.1 minutes to 28.0 minutes, and based on the total area of the chromatographic peaks of the polyhydric phenol resin, the area percentage of the chromatographic peak of the first component at the corresponding retention time in the spectrum ranges from 1.0% to 20.0%.

In some embodiments of the present invention, when the polyhydric phenol resin is characterized by carbon-13 nuclear magnetic resonance ($^{13}$C-NMR), the $^{13}$C-NMR spectrum of the polyhydric phenol resin has an integral value A of signals from 145 ppm to 160 ppm and an integral value B of signals from 28 ppm to 38 ppm, and the ratio of A to B (A/B) ranges from 0.5 to 3.0, wherein the solvent used in the $^{13}$C-NMR is dimethyl sulfoxide, and the reference substance used in the $^{13}$C-NMR is tetramethylsilane.

In some embodiments of the present invention, the polyhydric phenol resin is styrenated polyhydric phenol resin.

In some embodiments of the present invention, when the polyhydric phenol resin is characterized by gas chromatography-mass spectrometry (GC-MS), the first component is eluted at a retention time ranging from 18.000 minutes to 21.000 minutes, and a fragmentation pattern of the first component comprises one or more signals at a mass-to-charge ratio (m/z) selected from the group consisting of 51, 65, 77, 89, 91, 103, 104, 105, 115, 130, 165, 178, 193, and 208.

In some embodiments of the present invention, wherein the polyhydric phenol resin has a hydroxyl equivalent weight ranging from 150 g/eq to 320 g/eq.

In some embodiments of the present invention, the softening point temperature of the polyhydric phenol resin ranges from 30° C. to 70° C., wherein the softening point temperature is measured in accordance with JIS K 2207 ring and ball method.

Another objective of the present invention is to provide glycidyl ether of polyhydric phenol resin, which comprises a component of glycidyl ether of polyhydric phenol resin and a first component, wherein when the glycidyl ether of polyhydric phenol resin is characterized by high-performance liquid chromatography (HPLC), the first component is eluted at a retention time ranging from 27.1 minutes to 28.0 minutes, and based on the total area of the chromatographic peaks of the glycidyl ether of polyhydric phenol resin, the area percentage of the chromatographic peak of the first component at the corresponding retention time in the spectrum ranges from 1.0% to 20.0%.

In some embodiments of the present invention, when the glycidyl ether of polyhydric phenol resin is characterized by carbon-13 nuclear magnetic resonance ($^{13}$C-NMR), the $^{13}$C-NMR spectrum of the glycidyl ether of polyhydric phenol resin has an integral value A of signals from 145 ppm to 160 ppm and an integral value B of signals from 28 ppm to 38 ppm, the ratio of A to B (A/B) ranges from 0.5 to 3.0, wherein the solvent used in the $^{13}$C-NMR is dimethyl sulfoxide, and the reference substance used in the $^{13}$C-NMR is tetramethylsilane.

In some embodiments of the present invention, the glycidyl ether of polyhydric phenol resin is glycidyl ether of styrenated polyhydric phenol resin.

In some embodiments of the present invention, when the glycidyl ether of polyhydric phenol resin is characterized by GC-MS, the first component is eluted at a retention time ranging from 18.000 minutes to 21.000 minutes, and a fragmentation pattern of the first component comprises one or more signals at a mass-to-charge ratio (m/z) selected from the group consisting of 51, 65, 77, 89, 91, 103, 104, 105, 115, 130, 165, 178, 193, and 208.

In some embodiments of the present invention, the glycidyl ether of polyhydric phenol resin has an epoxy equivalent weight (EEW) ranging from 200 g/eq to 400 g/eq.

In some embodiments of the present invention, the glycidyl ether of polyhydric phenol resin comprises 300 ppm or less of hydrolyzable chlorine (HyCl).

In some embodiments of the present invention, the glycidyl ether of polyhydric phenol resin has a hydroxyl value (HV) ranging from 0.040 eq/100 g to 0.10 eq/100 g.

In some embodiments of the present invention, the glycidyl ether of polyhydric phenol resin comprises 0.003 meq/g to 0.015 meq/g of α-glycol.

Yet another objective of the present invention is to provide a curable composition, which comprises (a1) the aforementioned glycidyl ether of polyhydric phenol resin, and (b1) a hardener.

Furthermore, yet another objective of the present invention is to provide a copper-clad laminate, which comprises: (a2) a dielectric layer, which comprises a dielectric material obtained by curing the aforementioned curable composition; and (b2) a copper foil, which is disposed on the surface of the dielectric layer.

To render the above objectives, technical features and advantages of the present invention more apparent, the present invention will be described in detail regarding some embodiments hereinafter.

DESCRIPTION OF THE PREFERRED EMBODIMENTS

Hereinafter, some embodiments of the present invention will be described in detail. However, the present invention may be embodied in various embodiments and should not be limited to the embodiments described in the specification.

Unless it is additionally explained, the expressions "a," "the," or the like recited in the specification and the claims should include both the singular and the plural forms.

Unless it is additionally explained, the expressions "first", "second" or the like recited in the specification and the claims are merely used to distinguish the illustrated elements or constituents without special meanings, and those expressions do not intend to represent any priority.

Unless it is additionally explained, the "softening point temperature" is measured in accordance with JIS K 2207 ring and ball method.

Unless it is additionally explained, the "hydrolyzable chlorine (HyCl) amount" is measured in accordance with ASTM-D1652.

Unless it is additionally explained, the "α-glycol amount" is measured in accordance with JIS-K-7146.

Unless it is additionally explained, in the specification and the claims, the term "normal pressure" refers to a pressure of 1 (one) atmosphere (760 torrs), and the term "normal temperature" refers to a temperature of 25° C.

In the specification and the claims, a specific component being eluted at a specific range of retention time means that the chromatographic peaks appearing within the specific range of retention time indicate the region representing the specific component. The integral area of the chromatographic peaks of the specific component is calculated from the integral area of the chromatographic peaks within the retention time range. In addition, in the NMR detection, the integral value represents the integral value of the total areas of the signals within the given ppm range.

In the specification and the claims, in the HPLC spectrum and NMR spectrum, the determination of the area of a chromatographic peak is as follows. A B-V-B (baseline-valley-baseline) approach is applied, wherein all the chromatographic peaks or signal values use the same baseline, and a straight line is extended vertically to the baseline from each of the valleys of a specific chromatographic peak or a specific signal value down to the baseline to determine the area to be integrated for the specific chromatographic peak or the specific signal value. The baseline means a signal of a mobile phase or a background signal detected when no test sample passes through the detector.

The polyhydric phenol resin and the glycidyl ether of polyhydric phenol resin of the present invention each have excellent thermal resistance, flame retardance, moisture resistance, and electrical properties. The polyhydric phenol resin and the glycidyl ether of polyhydric phenol resin as well as their uses will be described in detail as follows.

1. Polyhydric Phenol Resin

The polyhydric phenol resin of the present invention comprises a polyhydric phenol resin component and a first component and has features characterized by HPLC spectrum. In some embodiments of the present invention, the polyhydric phenol resin component is a styrenated polyhydric phenol resin component. The styrenated polyhydric phenol resin component can have a structure represented by the following chemical formula (I).

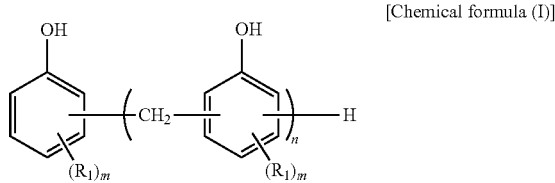

[Chemical formula (I)]

In chemical formula (I), $R_1$ is

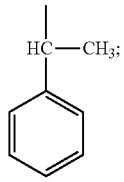

n is an integer of 1 to 20; and m is 0.1 to 3.0, such as 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, or within a range between any two of the values described herein. Here, m refers to the average number of styryl bonded to one phenol ring. For example, when n is 4, and the phenol ring at the left end has two styryl groups bonded thereto while other phenol rings each has one styryl bonded thereto, m is 1.2.

1.1. HPLC and $^{13}$C-NMR Characteristics of Polyhydric Phenol Resin

When the polyhydric phenol resin is characterized by HPLC, the first component is eluted at a retention time ranging from 27.1 minutes to 28.0 minutes; that is, the wave crest (peak value) of the chromatographic peak of the first component can fall at 27.1 minutes, 27.2 minutes, 27.3 minutes, 27.4 minutes, 27.5 minutes, 27.6 minutes, 27.7 minutes, 27.8 minutes, 27.9 minutes, or 28.0 minutes, or within a range between any two of the values described herein. In addition, based on the total area of the chromatographic peaks of the polyhydric phenol resin, the area percentage of the chromatographic peak of the first component at the corresponding retention time in the spectrum ranges from 1.0% to 20.0%. For example, the area percentage of the chromatographic peak of the first component at the corresponding retention time in the spectrum can be 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10.0%, 10.1%, 10.2%, 10.3%, 10.4%, 10.5%, 10.6%, 10.7%, 10.8%, 10.9%, 11.0%, 11.1%, 11.2%, 11.3%, 11.4%, 11.5%, 11.6%, 11.7%, 11.8%, 11.9%, 12.0%, 12.1%, 12.2%, 12.3%, 12.4%, 12.5%, 12.6%, 12.7%, 12.8%, 12.9%, 13.0%, 13.1%, 13.2%, 13.3%, 13.4%, 13.5%, 13.6%, 13.7%, 13.8%, 13.9%, 14.0%, 14.1%, 14.2%, 14.3%, 14.4%, 14.5%, 14.6%, 14.7%, 14.8%, 14.9%, 15.0%, 15.1%, 15.2%, 15.3%, 15.4%, 15.5%, 15.6%, 15.7%, 15.8%, 15.9%, 16.0%, 16.1%, 16.2%, 16.3%, 16.4%, 16.5%, 16.6%, 16.7%, 16.8%, 16.9%, 17.0%, 17.1%, 17.2%, 17.3%, 17.4%, 17.5%, 17.6%, 17.7%, 17.8%, 17.9%, 18.0%, 18.1%, 18.2%, 18.3%, 18.4%, 18.5%, 18.6%, 18.7%, 18.8%, 18.9%, 19.0%, 19.1%, 19.2%, 19.3%, 19.4%, 19.5%, 19.6%, 19.7%, 19.8%, 19.9%, or 20.0%, or within a range between any two of the values described herein. By means of controlling the amount of the first component in the polyhydric phenol resin within the aforementioned range, the thermal resistance and flame retardance of the polyhydric phenol resin can be improved, and the epoxy resin (also referred to "glycidyl ether of polyhydric phenol resin" herein) formed from the polyhydric phenol resin is particularly useful for circuit board material or high-frequency adhesives.

The aforementioned HPLC analysis is performed as follows. First, the polyhydric phenol resin is loaded into an octadecylsilane (ODS) column which is 250 mm in length and 4.6 mm in inner diameter and has fillers with a particle size of 5 μm. Then, the HPLC analysis is performed under the following conditions: a detector applying 254 nm wavelength ultraviolet light; a column temperature of 40° C.; a detector temperature of 35° C.; a mobile phase flow rate of 1.0 mL/min; a sample which is formulated with acetonitrile (ACN) as a solvent and has a sample concentration of 0.5 wt % in ACN; an injection amount of 15 μL; and a composition of mobile phase as follows: from 0 minutes to the $10^{th}$ minute of the washing time, the mobile phase is a mixture of 40 vol % of water and 60 vol % of acetonitrile; from the $10^{th}$ minute to the $30^{th}$ minute of the washing time, the mobile phase changes from a mixture of 40 vol % of water and 60 vol % of acetonitrile to 100 vol % of acetonitrile in a linear gradient manner with respect to time, and from the $30^{th}$ minute to the $50^{th}$ minute of the washing time, the mobile phase is 100 vol % of acetonitrile. Detailed descriptions regarding the linear gradient manner will be described in the following measuring method section of the Examples.

In some embodiments of the present invention, the first component is a compound represented by the following chemical formula (II). The compound represented by the chemical formula (II) is a dimer of styrene.

[Chemical formula (II)]

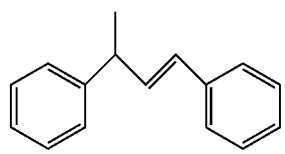

In some embodiments of the present invention, when the polyhydric phenol resin is characterized by carbon-13 nuclear magnetic resonance ($^{13}$C-NMR), the $^{13}$C-NMR spectrum of the polyhydric phenol resin has an integral value A of signals from 145 ppm to 160 ppm and an integral value B of signals from 28 ppm to 38 ppm, and the ratio of A to B (A/B) ranges from 0.5 to 3.0. For example, the ratio of A to B can be 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, or within a range between any two of the values described herein.

In the present invention, $^{13}$C-NMR is obtained by performing measurement using dimethyl sulfoxide as the solvent, and tetramethylsilane as the reference substance. In some embodiments of the present invention, $^{13}$C-NMR is performed by using a nuclear magnetic resonance spectrometer under the following conditions: a test temperature of 25° C., a resonance frequency of 400 MHz, a pulse width of 5.3 μs, a waiting time of 1 (one) second, a scan number of 10000 times, and a signal of tetramethylsilane being set as 0 ppm.

1.2. GC-MS Characteristic and Other Properties of Polyhydric Phenol Resin

In some embodiments of the present invention, when the polyhydric phenol resin is characterized by gas chromatography-mass spectrometry (GC-MS), the first component is eluted at a retention time ranging from 18.000 minutes to 21.000 minutes, that is, the wave crest (peak value) of the chromatographic peak of the first component can fall at 18.000 minutes, 18.100 minutes, 18.200 minutes, 18.300 minutes, 18.400 minutes, 18.500 minutes, 18.600 minutes, 18.700 minutes, 18.800 minutes, 18.900 minutes, 19.000 minutes, 19.100 minutes, 19.200 minutes, 19.300 minutes, 19.400 minutes, 19.500 minutes, 19.600 minutes, 19.700 minutes, 19.800 minutes, 19.900 minutes, 20.000 minutes, 20.100 minutes, 20.200 minutes, 20.300 minutes, 20.400 minutes, 20.500 minutes, 20.600 minutes, 20.700 minutes, 20.800 minutes, 20.900 minutes, or 21.000 minutes, or falls within a range between any two of the values described herein. The fragmentation pattern of the first component comprises one or more signals at a mass-to-charge ratio (m/z) selected from the group consisting of 51, 65, 77, 89, 91, 103, 104, 105, 115, 130, 165, 178, 193, and 208.

The aforementioned GC-MS analysis is performed as follows, wherein before performing the GC-MS analysis, it is preferred that the sample of the polyhydric phenol resin to be analyzed is subjected to pretreatment in the following manners. First, the sample of the polyhydric phenol resin is heated in an oven at 70° C. for 1 (one) hour to make the sample uniform. Then, the sample is mixed with acetone (i.e., a solvent) to prepare a solution with a weight percentage concentration of 1% to complete pretreatment of the sample to be analyzed.

First, the pretreated sample of polyhydric phenol resin is loaded into a gas chromatograph, the gas chromatograph is equipped with a Phenomenex Zebron ZB-5 capillary column (stationary phase composition: 5% phenyl, 95% dimethylpolysiloxane) which is 30 meters in length and 0.25 mm in inner diameter and has a film thickness of 0.25 μm. Under an inlet temperature of 350° C. and a carrier gas of helium with a flow rate of 1.8 mL/min, the oven of the gas chromatograph is subjected to the following stepped heating operation: the temperature is maintained at 50° C. for 5 minutes, then raised from 50° C. to 340° C. with a heating rate of 10° C./min and maintained at 340° C. for 26 minutes. Afterwards, the gas chromatograph is connected with a mass spectrograph, and the GC-MS analysis is operated under the following conditions: electron energy of 70 eV, an ion source temperature of 250° C., use of a quadrupole mass filter, an interface temperature of 340° C., a mass scan range of 29.0 daltons to 1090 daltons, a solvent delay time of 1.85 minutes, and a scan rate of 5000 u/sec.

In some embodiments of the present invention, the polyhydric phenol resin further has a hydroxyl equivalent weight ranging from 150 g/eq to 320 g/eq. For example, the hydroxyl equivalent weight of the polyhydric phenol resin can be 150 g/eq, 155 g/eq, 160 g/eq, 165 g/eq, 170 g/eq, 175 g/eq, 180 g/eq, 185 g/eq, 190 g/eq, 195 g/eq, 200 g/eq, 205 g/eq, 210 g/eq, 215 g/eq, 220 g/eq, 225 g/eq, 230 g/eq, 235 g/eq, 240 g/eq, 245 g/eq, 250 g/eq, 255 g/eq, 260 g/eq, 265 g/eq, 270 g/eq, 275 g/eq, 280 g/eq, 285 g/eq, 290 g/eq, 295 g/eq, 300 g/eq, 305 g/eq, 310 g/eq, 315 g/eq, or 320 g/eq, or within a range between any two of the values described herein.

In some embodiments of the present invention, the polyhydric phenol resin further has a softening point temperature ranging from 30° C. to 70° C. For example, the softening point temperature of the polyhydric phenol resin can be 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., or 70° C., or within a range between any two of the values described herein. The aforementioned softening point temperature is measured in accordance with the ring and ball method of JIS K 2207.

1.3. Preparation of Polyhydric Phenol Resin

The polyhydric phenol resin of the present invention can be prepared by reacting phenols with formaldehyde. For example, a styrenated polyhydric phenol resin can be prepared by reacting phenols with styrene to form styrenated phenols and then reacting styrenated phenols with formaldehyde. Alternatively, a styrenated polyhydric phenol resin can be prepared by reacting phenols with formaldehyde to form polyhydric phenol resin and then reacting styrene with the polyhydric phenol resin via addition reaction.

Examples of the aforementioned phenols include but are not limited to phenol, m-cresol, p-cresol, o-cresol, ethylphenol, isopropylphenol, t-butylphenol, allylphenol and phenylphenol. In some embodiments of the present invention, the polyhydric phenol is prepared by using phenol and styrene.

The aforementioned reaction of styrenated phenols and formaldehyde can be performed in the presence of acid catalysts. The acid catalysts include organic acids and inorganic acids. Examples of inorganic acids include but are not limited to hydrochloric acid, sulfuric acid, and phosphoric acid. Examples of organic acids include but are not limited to methanoic acid, oxalic acid, trifluoroacetic acid, p-toluenesulfonic acid, methanesulfonic acid, and dimethylsulfuric acid. In some embodiments of the present invention, the polyhydric phenol is prepared by using oxalic acid, p-toluenesulfonic acid, or methanesulfonic acid. In addition, the aforementioned reaction of phenols with formaldehyde and the addition reaction of styrene and polyhydric phenol resin can also be performed in the presence of an acid catalyst, and examples of the acid catalysts includes the aforementioned organic acids and inorganic acids suitable for the reaction of styrenated phenols and formaldehyde.

The styrene used in the present invention can further comprise one or more substituents. Examples of substituents include methyl, ethyl, propyl, dimethyl, and diethyl. The oligomer formed from the styrene can also comprise the aforementioned substituents.

The reaction of styrenated phenols and formaldehyde can be performed under the following conditions. Formaldehyde is dripped into a mixture of styrenated phenols and an acid catalyst at 80° C. to 100° C. in 1 (one) hour to 4 hours, and then the temperature is raised to 120° C. to 160° C. to remove water by distillation under normal pressure for 1 (one) hour to 4 hours. Afterwards, a neutralizing agent is added, and the temperature is raised to 150° C. to 200° C. to perform reduced pressure distillation under an absolute pressure of 10 mmHg to 100 mmHg for 0.5 hours to 3 hours to obtain styrenated polyhydric phenol resin. Examples of neutralizing agents include but are not limited to sodium hydroxide, sodium hydrogen carbonate, potassium hydroxide, sodium acetate, and sodium carbonate.

The reaction of phenols and formaldehyde can be performed under the following conditions. Formaldehyde is dripped into a mixture of phenols and an acid catalyst at 80° C. to 100° C. in 1 (one) hour to 4 hours, and then the temperature is raised to 120° C. to 160° C. to remove water by distillation under normal pressure for 1 (one) hour to 4 hours. Afterwards, the temperature is raised to 150° C. and 200° C. to perform reduced pressure distillation under an absolute pressure of 10 mmHg to 100 mmHg for 0.5 hours to 3 hours to obtain polyhydric phenol resin.

The addition reaction of styrene and polyhydric phenol resin can be performed under the following conditions. Styrene is dripped into a mixture of polyhydric phenol resin and an acid catalyst at 90° C. to 140° C. for 1 (one) hour to 4 hours, and the reaction is performed for 0.5 hours to 2 hours. Then, the temperature is raised to 150° C. and 200° C. to perform reduced pressure distillation under an absolute pressure of 10 mmHg to 100 mmHg for 0.5 hours to 3 hours to obtain styrenated polyhydric phenol resin.

2. Glycidyl Ether of Polyhydric Phenol Resin

The present invention also provides a glycidyl ether of polyhydric phenol resin, which can be obtained by performing glycidyl etherification of the polyhydric phenol resin of the present invention. The glycidyl ether of polyhydric phenol resin of the present invention has features characterized by HPLC spectrum, and the glycidyl ether of polyhydric phenol resin of the present invention comprises a component of glycidyl ether of polyhydric phenol resin and a first component. In some embodiments of the present invention, the component of glycidyl ether of polyhydric phenol resin is a component of glycidyl ether of styrenated polyhydric phenol resin. In some embodiments of the present invention, the component of glycidyl ether of styrenated polyhydric phenol resin has a structure represented by the following chemical formula (III).

[Chemical formula (III)]

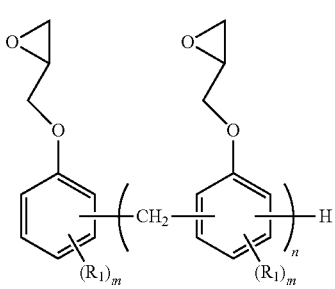

In chemical formula (III), $R_1$

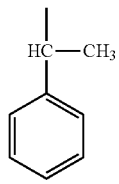

is; n is an integer of 1 to 20; and m is 0.1 to 3.0, such as 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, or within a range between any two of the values described herein. Here, m refers to the average number of styryl bonded to one phenol ring. For example, when n is 4, and the phenol ring at the left end has two styryl groups bonded thereto while other phenol rings each has one styryl bonded thereto, m is 1.2.

2.1. HPLC and $^{13}$C-NMR Characteristics of Glycidyl Ether of Polyhydric Phenol Resin When the glycidyl ether of polyhydric phenol resin is characterized by HPLC, the first component is eluted at a retention time ranging from 27.1 minutes to 28.0 minutes, that is, the wave crest (peak value) of the chromatographic peak of the first component can fall at 27.1 minutes, 27.2 minutes, 27.3 minutes, 27.4 minutes, 27.5 minutes, 27.6 minutes, 27.7 minutes, 27.8 minutes, 27.9 minutes, or 28.0 minutes, or falls within a range between any two of the values described herein. In addition, based on the total area of the chromatographic peaks of the glycidyl ether of polyhydric phenol resin, the area percentage of the chromatographic peak of the first component at the corresponding retention time in the spectrum ranges from 1.0% to 20.0%. For example, the area percentage of the chromatographic peak of the first component at the corresponding retention time in the spectrum can be 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10.0%, 10.1%, 10.2%, 10.3%, 10.4%, 10.5%, 10.6%, 10.7%, 10.8%, 10.9%, 11.0%, 11.1%, 11.2%, 11.3%, 11.4%, 11.5%, 11.6%, 11.7%, 11.8%, 11.9%, 12.0%, 12.1%, 12.2%, 12.3%, 12.4%, 12.5%, 12.6%, 12.7%, 12.8%, 12.9%, 13.0%, 13.1%, 13.2%, 13.3%, 13.4%, 13.5%, 13.6%, 13.7%, 13.8%, 13.9%, 14.0%, 14.1%, 14.2%, 14.3%, 14.4%, 14.5%, 14.6%, 14.7%, 14.8%, 14.9%, 15.0%, 15.1%, 15.2%, 15.3%, 15.4%, 15.5%, 15.6%, 15.7%, 15.8%, 15.9%, 16.0%, 16.1%, 16.2%, 16.3%, 16.4%, 16.5%, 16.6%, 16.7%, 16.8%, 16.9%, 17.0%, 17.1%, 17.2%, 17.3%, 17.4%, 17.5%, 17.6%, 17.7%, 17.8%, 17.9%, 18.0%, 18.1%, 18.2%, 18.3%, 18.4%, 18.5%, 18.6%, 18.7%, 18.8%, 18.9%, 19.0%, 19.1%, 19.2%, 19.3%, 19.4%, 19.5%, 19.6%, 19.7%, 19.8%, 19.9%, or 20.0%, or within a range between any two of the values described herein. By means of controlling the amount of the first component of the glycidyl ether of polyhydric phenol resin within the aforementioned range, the thermal resistance and flame retardance of the glycidyl ether of polyhydric phenol resin can be improved, and the glycidyl ether of polyhydric phenol resin is particularly useful for circuit board material or high-frequency adhesives.

The aforementioned HPLC is performed as below. First, the glycidyl ether of polyhydric phenol resin is loaded into an ODS column of 250 mm in length, 4.6 mm in inner diameter and has fillers with a filler particle size of 5 μm. Then, HPLC analysis is performed under the following conditions: a detector applying 254 nm wavelength ultraviolet light; a column temperature of 40° C.; a detector temperature of 35° C.; a mobile phase flow rate of 1.0 mL/min; a sample which is formulated with acetonitrile (CAN) as a solvent and has a sample concentration of 0.5 wt % in ACN; an injection amount of 15 μL; and a composition of mobile phase as follows: from 0 minutes to the $10^{th}$ minute of the washing time, the mobile phase is a mixture of 40 vol % of water and 60 vol % of acetonitrile; from the $10^{th}$ minute to the $30^{th}$ minute of the washing time, the mobile phase changes from a mixture of 40 vol % of water and 60 vol % of acetonitrile to 100 vol % of acetonitrile in a linear gradient manner with respect to time; and from the $30^{th}$ minute to the $50^{th}$ minute of the washing time, the mobile phase is 100 vol % of acetonitrile.

In some embodiments of the present invention, the first component is a compound represented by the following chemical formula (II).

[Chemical formula (II)]

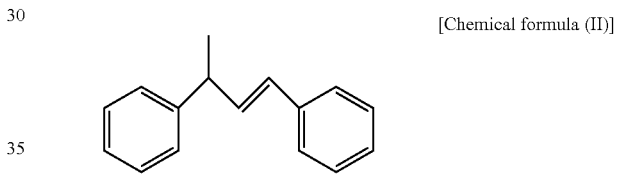

In some embodiments of the present invention, when the glycidyl ether of polyhydric phenol resin is characterized by $^{13}$C-NMR, the $^{13}$C-NMR spectrum of the glycidyl ether of polyhydric phenol resin has an integral value A of signals from 145 ppm to 160 ppm and an integral value B of signals from 28 ppm to 38 ppm, and the ratio of A to B (A/B) ranges from 0.5 to 3.0, such as 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, or within a range between any two of the values described herein.

In the present invention, $^{13}$C-NMR is obtained by performing measurement using dimethyl sulfoxide as the solvent, and tetramethylsilane as the reference substance. In some embodiments of the present invention, $^{13}$C-NMR is performed by using a nuclear magnetic resonance spectrometer under the following conditions: a test temperature of 25° C., a resonance frequency of 400 MHz, a pulse width of 5.3 μs, a waiting time of 1 (one) second, a scan number of 10000 times, and a signal of tetramethylsilane being set as 0 ppm.

2.2. GC-MS Characteristic and Other Properties of Glycidyl Ether of Polyhydric Phenol Resin In some embodiments of the present invention, when the glycidyl ether of polyhydric phenol resin is characterized by GC-MS, the first component is eluted at a retention time ranging from 18.000 minutes to 21.000 minutes, that is, the wave crest (peak value) of the chromatographic peak of the first component can fall at 18.000 minutes, 18.100 minutes, 18.200 minutes, 18.300 minutes, 18.400 minutes, 18.500 minutes, 18.600 minutes, 18.700 minutes, 18.800 minutes, 18.900 minutes, 19.000 minutes, 19.100 minutes, 19.200 minutes, 19.300 minutes, 19.400 minutes, 19.500 minutes, 19.600 minutes, 19.700 minutes, 19.800 minutes, 19.900 minutes, 20.000 minutes, 20.100 minutes, 20.200 minutes, 20.300 minutes, 20.400 minutes, 20.500 minutes, 20.600 minutes, 20.700 minutes, 20.800 minutes, 20.900 minutes, or 21.000 minutes, or falls within a range between any two of the values described herein. The fragmentation pattern of the first component comprises one or more signals at a mass-to-charge ratio (m/z) selected from the group consisting of 51, 65, 77, 89, 91, 103, 104, 105, 115, 130, 165, 178, 193, and 208.

The aforementioned GC-MS analysis is performed as follows, wherein before performing the GC-MS analysis, it is preferred that the sample of the glycidyl ether of polyhydric phenol resin to be analyzed is subjected to pretreatment in the following manners. First, the sample of the glycidyl ether of polyhydric phenol resin is heated in an oven at 70° C. for 1 (one) hour to make the sample uniform. Then, the sample is mixed with acetone (i.e., a solvent) to prepare a solution with a weight percentage concentration of 1% to complete pretreatment of the sample to be tested.

The pretreated sample of glycidyl ether of polyhydric phenol resin is loaded into a gas chromatograph, the gas chromatograph is equipped with a Phenomenex Zebron ZB-5 capillary column (stationary phase composition: 5% phenyl, 95% dimethylpolysiloxane) which is 30 meters in length and 0.25 mm in inner diameter and has a film thickness of 0.25 μm. Under a carrier gas of helium with a flow rate of 1.8 mL/min and an inlet temperature of 350° C., the oven of the gas chromatograph is subjected to the following stepped heating operation: the temperature is maintained at 50° C. for 5 minutes, then raised from 50° C. to 340° C. with a heating rate of 10° C./min and maintained at 340° C. for 26 minutes. Then, the gas chromatograph is connected with a mass spectrograph, and the GC-MS analysis is operated under the following conditions: electron energy of 70 eV, an ion source temperature of 250° C., use of a quadrupole mass filter, an interface temperature of 340° C., a mass scan range of 29.0 daltons to 1090 daltons, a solvent delay time of 1.85 minutes, and a scan rate of 5000 u/sec.

In some embodiments of the present invention, the glycidyl ether of polyhydric phenol resin further has an EEW ranging from 200 g/eq to 400 g/eq, such as an EEW of 200 g/eq, 205 g/eq, 210 g/eq, 215 g/eq, 220 g/eq, 225 g/eq, 230 g/eq, 235 g/eq, 240 g/eq, 245 g/eq, 250 g/eq, 255 g/eq, 260 g/eq, 265 g/eq, 270 g/eq, 275 g/eq, 280 g/eq, 285 g/eq, 290 g/eq, 295 g/eq, 300 g/eq, 305 g/eq, 310 g/eq, 315 g/eq, 320 g/eq, 325 g/eq, 330 g/eq, 335 g/eq, 340 g/eq, 345 g/eq, 350 g/eq, 355 g/eq, 360 g/eq, 365 g/eq, 370 g/eq, 375 g/eq, 380 g/eq, 385 g/eq, 390 g/eq, 395 g/eq, or 400 g/eq, or an EEW within a range between any two of the values described herein.

In some embodiments of the present invention, the glycidyl ether of polyhydric phenol resin comprises 300 ppm or less of HyCl. For example, the content of HyCl can be 300 ppm, 290 ppm, 280 ppm, 270 ppm, 260 ppm, 250 ppm, 240 ppm, 230 ppm, 220 ppm, 210 ppm, 200 ppm, 190 ppm, 180 ppm, 170 ppm, 160 ppm, 150 ppm, 140 ppm, 130 ppm, 120 ppm, 110 ppm, 100 ppm, 90 ppm, 80 ppm, 70 ppm, 60 ppm, 50 ppm, 40 ppm, 30 ppm, 20 ppm, 10 ppm, 5 ppm, 1 ppm, or 0 ppm, or within a range between any two of the values described herein.

In some embodiments of the present invention, the glycidyl ether of polyhydric phenol resin further has a HV ranging from 0.040 eq/100 g to 0.10 eq/100 g, such as a HV of 0.040 eq/100 g, 0.045 eq/100 g, 0.050 eq/100 g, 0.055 eq/100 g, 0.060 eq/100 g, 0.065 eq/100 g, 0.070 eq/100 g, 0.075 eq/100 g, 0.080 eq/100 g, 0.085 eq/100 g, 0.090 eq/100 g, 0.095 eq/100 g, or 0.10 eq/100 g, or a HV within a range between any two of the values described herein.

In some embodiments of the present invention, the glycidyl ether of polyhydric phenol resin further comprises 0.003 meq/g to 0.015 meq/g of α-glycol. For example, the content of α-glycol can be 0.003 meq/g, 0.004 meq/g, 0.005 meq/g, 0.006 meq/g, 0.007 meq/g, 0.008 meq/g, 0.009 meq/g, 0.01 meq/g, 0.011 meq/g, 0.012 meq/g, 0.013 meq/g, 0.014 meq/g, or 0.015 meq/g, or within a range between any two of the values described herein.

2.3. Preparation of Glycidyl Ether of Polyhydric Phenol Resin

The glycidyl ether of polyhydric phenol resin of the present invention can be prepared by reacting polyhydric phenol resin with epihalohydrin. For example, glycidyl ether of styrenated polyhydric phenol resin can be prepared by reacting a styrenated polyhydric phenol resin with an epihalohydrin or can be prepared by reacting a styrenated polyhydric phenol resin with allyl halide to form allyl ether of styrenated polyhydric phenol resin and then reacting allyl ether of styrenated polyhydric phenol resin with peroxides. Examples of epihalohydrin include but are not limited to epichlorohydrin. Examples of allyl halide include but are not limited to allyl chloride.

The reaction of styrenated polyhydric phenol resin and epichlorohydrin can be performed in the presence of alkali metal hydroxides. Examples of the alkali metal hydroxides include but are not limited to sodium hydroxide, potassium hydroxide and lithium hydroxide.

Specifically, the reaction of styrenated polyhydric phenol resin and epichlorohydrin can be performed under the following conditions. Styrenated polyhydric phenol resin, epichlorohydrin and a solvent are mixed under normal pressure to obtain a mixture. The mixture is heated to 60° C. to 80° C. under an absolute pressure of 170 mmHg to 200 mmHg, and then an alkali metal hydroxide is dripped thereinto while the mixture is maintained at 60° C. to 80° C. for 5 hours to 10 hours to react. The unreacted epichlorohydrin and the solvent are recovered via vacuum and the product is washed by the solvent. Afterwards, the solvent is removed by vacuum to obtain glycidyl ether of styrenated polyhydric phenol resin.

Alternatively, the reaction of styrenated polyhydric phenol resin and epichlorohydrin can be performed under the following conditions. Styrenated polyhydric phenol resin, epichlorohydrin and a coupling agent are mixed under normal pressure at 20° C. to 50° C. to form a mixture with uniform composition. Then, the mixture is heated to 60° C. to 90° C. within 40 hours to 60 hours and maintained at said temperature for 12 hours to 20 hours. Afterwards, an alkali metal hydroxide is dripped into the mixture at 50° C. to 70° C. within 5 hours to 7 hours. The mixture is subjected to azeotropic distillation and condensation at an absolute pressure of 50 mmHg to 150 mmHg and maintained for 0.5 hours to 2 hours to perform dehydrohalogenation, and during the azeotropic distillation and condensation, the organic phase is recovered back to the reactor. Next, after the unreacted epichlorohydrin is removed under reduced pressure, dehydrohalogenation is performed again and an alkali metal hydroxide is added at 60° C. to 100° C. under normal pressure. The obtained crude product is washed with a solvent and the solvent is then filtered and removed under reduced pressure to obtain a glycidyl ether of styrenated polyhydric phenol resin.

3. Curable Composition

The glycidyl ether of polyhydric phenol resin of the present invention can be cured to form a dielectric material or a high-frequency adhesive. Thus, the present invention also provides a curable composition, which comprises (a1) the aforementioned glycidyl ether of polyhydric phenol resin, and (b1) a hardener.

Examples of the aforementioned hardener include but are not limited to guanidine-based hardeners, anhydride-based hardeners, polyvalent phenol-based hardeners, aromatic amine-based hardeners, and aliphatic amine-based hardeners. Examples of guanidine-based hardeners include but are not limited to dicyandiamide. Examples of anhydride-based hardeners include but are not limited to phthalic anhydride, tetrahydrophthalic anhydride, methyltetrahydrophthalic anhydride, hexahydrophthalic anhydride, methylhexahydrophthalic anhydride, methylbicycloheptenedicarboxlic anhydride, dodecylsuccinic anhydride, and trimellitic anhydride. Examples of polyvalent phenol-based hardeners include but are not limited to bisphenol A, bisphenol F, bisphenol S, 2,2'-diphenol, 4,4'-diphenol, hydroquinone, resorcinol, naphthalenediol, tri-(4-hydroxyphenyl)methane, and 1,1,2,2,-tetra(4-hydroxyphenyl)ethane. Examples of aromatic amine-based hardeners include but are not limited to 4,4'-diaminodiphenyl methane, 4,4'-diaminodiphenyl propane, m-phenylene diamine, and p-xylenediamine. Examples of aliphatic amine-based hardeners include but are not limited to ethylenediamine, hexamethylenediamine, diethylenetriamine, and diethylenetetraamine. In the appended examples, dicyandiamide is used as the hardener.

4. Application of Glycidyl Ether of Polyhydric Phenol Resin

The curable composition of the present invention can be used to prepare a circuit board material. Thus, the present invention also provides a copper-clad laminate. The copper-clad laminate comprises (a2) a dielectric layer, which comprises a dielectric material obtained by curing the aforementioned curable composition; and (b2) a copper foil, which is disposed on the surface of the dielectric layer. The copper-clad laminate of the present invention can pass the 288° C. floating solder test, and has good peeling strength, flame retardance and thermal resistance (e.g., low glass transition temperature (Tg), especially low water absorption and low coefficient of thermal expansion (CTE)).

In addition, the glycidyl ether of polyhydric phenol resin of the present invention can also be used as a material of high-frequency adhesive. For example, a high-frequency adhesive film can be obtained by mixing the glycidyl ether of polyhydric phenol resin, polytetrafluoroethylene, polyimide, a hardener, and a hardening promoter to form a mixture, and then coating the mixture onto a release film and baking the coated mixture. Examples of the hardener include but are not limited to imidazoles, amines, phenols, and organic metal salts, but the present invention is not limited thereto. The high-frequency adhesive of the present invention can pass the 288° C. floating solder test and has good peeling strength as well as dielectric properties.

5. Example

5.1. Measuring Methods

The present application is further illustrated by the embodiments hereinafter, wherein the testing instruments and methods are as follows:

[HPLC Analysis]

The polyhydric phenol resin or glycidyl ether of polyhydric phenol resin is injected into a high-performance liquid chromatograph (model no.: Waters 600), and the high-performance liquid chromatograph is equipped with an ODS column which is 250 mm in length, 4.6 mm in inner diameter and has a filler with a particle size of 5 HPLC analysis is performed under the following conditions: a detector applying 254 nm wavelength ultraviolet light; a column temperature of 40° C.; a detector temperature of 35° C.; a mobile phase flow rate of 1.0 mL/min; a sample which is formulated with acetonitrile (ACN) as a solvent and has a sample concentration of 0.5 wt % in ACN; an injection amount of 15 μL; and a composition of mobile phase as follows: from 0 minutes to the $10^{th}$ minute of the washing time, the mobile phase is a mixture of 40 vol % of water and 60 vol % of acetonitrile; from the $10^{th}$ minute to the $30^{th}$ minute of the washing time, the mobile phase changes from a mixture of 40 vol % of water and 60 vol % of acetonitrile to 100 vol % of acetonitrile in a linear gradient manner with respect to time, and from the $30^{th}$ minute to the $50^{th}$ minute of the washing time, the mobile phase is 100 vol % of acetonitrile. The meaning of changing mobile phase in a linear gradient manner are as follows: a mixture of 40 vol % of water and 60 vol % of acetonitrile is used at the beginning of the $10^{th}$ minute; a mixture of 30 vol % of water and 70 vol % of acetonitrile is used at the beginning of the $15^{th}$ minute; a mixture of 20 vol % of water and 80 vol % of acetonitrile is used at the beginning of the $20^{th}$ minute; a mixture of 10 vol % of water and 90 vol % of acetonitrile is used at the beginning of the $25^{th}$ minute; and 100 vol % of acetonitrile is used at the beginning of the $30^{th}$ minute.

[$^{13}$C-NMR Analysis]

10 mg of the polyhydric phenol resin or glycidyl ether of polyhydric phenol resin is added into 0.75 mL of dimethyl sulfoxide to prepare a test sample. Tetramethylsilane is added to the test sample as a reference substance for chemical shift referencing, and the test sample is measured by using a nuclear magnetic resonance spectrometer (model no.: DRX-400, available from Bruker) to obtain the $^{13}$C-NMR spectrum of the test sample. The measuring conditions are as follows: a test temperature of 25° C., a resonance frequency of 400 MHz, a pulse width of 5.3 microseconds, a waiting time of 1 (one) second, a scan number of 10000, and a signal of tetramethylsilane being set as 0 ppm.

[GC-MS Analysis]

A sample of the polyhydric phenol resin or glycidyl ether of polyhydric phenol resin is heated in an oven at 70° C. for 1 (one) hour to make the sample uniform. Then, the sample is mixed with acetone (i.e., a solvent) to prepare a solution with a weight percentage concentration of 1% to complete pretreatment of the sample to be tested.

The pretreated sample is loaded into a gas chromatograph, the gas chromatograph is equipped with a Phenomenex Zebron ZB-5 capillary column (stationary phase composition: 5% phenyl, 95% dimethylpolysiloxane) which is 30 meters in length and 0.25 mm in inner diameter and has a film thickness of 0.25 μm. Under a carrier gas of helium with a flow rate of 1.8 mL/min and an inlet temperature of 350° C., the oven of the gas chromatograph is subjected to the following stepped heating operation: the temperature is maintained at 50° C. for 5 minutes, then raised from 50° C. to 340° C. with a heating rate of 10° C./min and maintained at 340° C. for 26 minutes. Then, the gas chromatograph is connected with a mass spectrograph, and the GC-MS analysis is operated under the following conditions: electron energy of 70 eV, an ion source temperature of 250° C., use of a quadrupole mass filter, an interface temperature of 340° C., a mass scan range of 29.0 daltons to 1090 daltons, a solvent delay time of 1.85 minutes, and a scan rate of 5000 u/sec.

[Hydroxyl Equivalent Weight Measurement]

First, the hydroxyl value (unit: mg KOH/g) of polyhydric phenol resin is determined in accordance with the acetylation method recited in HG/T 2709. Next, the hydroxyl value is converted to a hydroxyl equivalent weight (unit: g/eq) by the following formula.

$$\text{Hydroxyl equivalent weight}(g/eq) = \frac{1000 \times 56.1}{\text{Hydroxyl value (mg KOH/g)}}$$

[Softening Point Temperature Measurement]

The softening point temperature is measured in accordance with the ring and ball method as recited in JIS-K-2207.

[Epoxy Equivalent Weight Measurement]

The epoxy equivalent weight of the glycidyl ether of polyhydric phenol resin is measured in accordance with ASTM-D1652.

[Hydrolyzable Chlorine Content Measurement]

The hydrolysable chlorine content of the glycidyl ether of polyhydric phenol resin is measured in accordance with ASTM-D1726.

[α-Glycol Content Measurement]

The α-glycol content of the glycidyl ether of polyhydric phenol resin is measured in accordance with JIS-K-7146.

[Gardner Color Scale Measurement]

The Gardner color scale of the glycidyl ether of polyhydric phenol resin is measured in accordance with ASTM-D6166, wherein the concentration of the polyphenolic condensate in cresol is 5 wt %, and the concentration of polyfunctional epoxy resin in methanol is 17.5 wt %.

[Hydroxyl Value Measurement]

The hydroxyl value (HV) of the glycidyl ether of polyhydric phenol resin is measured in accordance with ASTM-E222 Method C, wherein the hydroxyl value is converted in accordance with the following formula:

$$HV(eq/100 \text{ g}) = \frac{(V_o - V_s) \times C}{10 \times W} - 2 \times \frac{100}{EEW}$$

wherein:

C represents the content of sodium hydroxide standard solution, which is 0.5 meq/mL;

EEW represents the epoxy equivalent weight of the test sample (unit: g/eq);

$V_o$ represents the number of milliliters of sodium hydroxide standard solution required for a blank test.

$V_s$ represents the number of milliliters of sodium hydroxide standard solution required for testing the test sample; and W represents the weight of the test sample (unit: gram).

[288° C. Floating Solder Test]

The 288° C. floating solder test is performed in accordance with JIS-C-6481, wherein the copper-clad laminate or a high-frequency adhesive is dipped into a 288° C. soldering furnace, and the time required for delamination of the copper-clad laminate or a high-frequency adhesive is recorded. The standards are as follows: if delamination of the copper-clad laminate occurs within 60 seconds, it means that the copper-clad laminate fails in the 288° C. floating solder test, and the result is recorded as "failed"; if no delamination of the copper-clad laminate occurs within 60 seconds, it means that the copper-clad laminate passes the 288° C. floating solder test, and the result is recorded as "passed"; if delamination of the high-frequency adhesive occurs within 60 seconds, it means that the high-frequency adhesive fails in the 288° C. floating solder test, and the result is recorded as "failed"; if no delamination of the high-frequency adhesive occurs within 60 seconds, it means that the high-frequency adhesive passes the 288° C. floating solder test is passed, and the result is recorded as "passed".

[Peeling Strength Test]

The peeling strength of the copper-clad laminate or high-frequency adhesive is measured in accordance with IPC-TM-650-2.4.8. The peeling strength refers to the bonding strength between the copper foil and the laminated dielectric layer or the bonding strength between the copper foil and the laminated high-frequency adhesive film. In this test, the peeling strength is expressed as the force required to vertically peel a copper foil of 1 (one) ounce from the surface of the laminated layer or laminated adhesive film. The unit of the peeling strength is kilogram-force/centimeter (kgf/cm).

[Flame Retardance Test]

The flame retardance test is carried out according to UL94V (Vertical Burn), wherein the copper-clad laminate is vertically held and burned using a Bunsen burner, and the required period (unit: second) for the copper-clad laminate to stop burning is recorded.

[Water Absorption Test]

First, the weight of the copper-clad laminate is measured. Then, the copper-clad laminate is placed in 100° C. water for 7 days, and the weight of the copper-clad laminate after being dipped in water for 7 days is measured to calculate the ratio of the increased weight (wt %).

[Decomposition Temperature (Td) Test]

The Td (i.e., 5% weight loss temperature) of the copper-clad laminate is measured in accordance with IPC-TM-650-2.3.40. The instrument used to measure Td is a thermogravimetric analyzer (model no.: Q500, available from TA Instruments), wherein the scanning rate is 10° C./min.

[Glass Transition Temperature (Tg) Test]

The Tg of the copper-clad laminate is measured in accordance with IPC-TM-650-2.44.4. The instrument used to measure Tg is a dynamic mechanical analyzer (model no.: Q800, available from TA Instruments), wherein the scanning rate is 2° C./min.

[Coefficient of Thermal Expansion (CTE) Test]

The CTE-α1 and CTE-α2 of the copper-clad laminate are measured in accordance with IPC-TM-650-2.4.24. The instrument used to measure CTE-α1 and CTE-α2 is a thermomechanical analyzer (model no.: TMA 7, available from Perkin Elmer), wherein CTE-α1 is a CTE at a temperature lower than Tg, and CTE-α2 is a CTE at a temperature higher than Tg.

[Dielectric Properties Test]

The dielectric constant (Dk) and dissipation factor (Df) of the high-frequency adhesive film are measured in accordance with IPC-TM-2.5.5.9 under an operating frequency of 10 GHz.

5.2. Synthesis of Styrenated Polyhydric Phenol Resin

Synthesis Example 1-1

First, the purification of styrenated phenol was performed. A 1 (one) liter four-necked glass reaction kettle was equipped with a condensing tube, a collection bottle, and a vacuum device. 300 g of styrenated monophenol (available from Sanko Chemical, purity: 96%, OH equivalent: 201 g/eq) was put into the glass kettle to perform a reduced pressure distillation purification, wherein the absolute pressure was reduced to 20 mmHg, the substances with a boiling point ranging from 190° C. to 196° C. were collected, and the collected substances were weighed 275 g. The purified styrenated monophenol has a purity of 99.1% and an OH equivalent of 199 g/eq as analyzed by GC.

Next, a styrenated polyhydric phenol resin was synthesized by reacting the styrenated monophenol and formaldehyde. 2000 g of the purified styrenated monophenol (purity: 99.1%, OH equivalent: 199 g/eq, 9.95 mol) and 5.3 g of p-toluenesulfonic acid monohydrate (0.03 mol) were put into a 1 (one) liter four-necked glass reaction kettle, and temperature was set to 85° C. After 116.5 g of 37 wt % formaldehyde aqueous solution (1.44 mol) was continuously dripped into the four-necked glass reaction kettle within 2 hours, the temperature was raised to 140° C. and distillation was performed under normal pressure for 2 hours to remove water. 2.3 g of 49 wt % NaOH aqueous solution was added to neutralize, and reduced pressure distillation was performed under an absolute pressure of 20 mmHg and the temperature was raised to 195° C. and maintained for 1 (one) hour to obtain 329 g of the styrenated polyhydric phenol resin of Synthesis Example 1-1 (OH equivalent: 209 g/eq).

Synthesis Example 1-2

First, the synthesis of polyhydric phenol resin was performed. 1223.4 g of phenol (13 mol) and 4.3 g of oxalic acid dehydrate (0.03 mol) were put into a 3 liter four-necked glass reaction kettle, and the temperature was set to 90° C. After 105.4 g of 37 wt % formaldehyde aqueous solution (1.3 mol) was continuously dripped into the four-necked glass reaction kettle within 2 hours, the temperature was raised to 140° C. and distillation was performed under normal pressure for 2 hours to remove water. Then, reduced pressure distillation was performed under an absolute pressure of 30 mmHg and the temperature was raised to 170° C. and maintained for 1 (one) hour to obtain 214.0 g of the polyhydric phenol resin (OH equivalent: 103 g/eq).

Then, the polyhydric phenol resin was modified with styrene. 200 g of the aforementioned polyhydric phenol resin (OH equivalent: 103 g/eq, 1.9 mol) and 0.18 g of methanesulfonic acid (596 ppm) were put into a 1 (one) liter four-necked glass reaction kettle, and the temperature was set to 110° C. After 102 g of styrene (1.0 mol) was continuously dripped into the four-necked glass reaction kettle within 2 hours and then reacted for 1 (one) hour, 3.2 g of 5 wt % NaHCO$_3$ aqueous solution was added to neutralize. Next, reduced pressure distillation was performed under an absolute pressure of 30 mmHg and the temperature was raised to 170° C. and maintained for 1 (one) hour to obtain 296 g of the styrenated polyhydric phenol resin of Synthesis Example 1-2 (OH equivalent: 156 g/eq).

Synthesis Example 1-3

The preparation procedures of Synthesis Example 1-2 were repeated to prepare the styrenated polyhydric phenol resin of Synthesis Example 1-3, except that in the modification of polyhydric phenol resin with styrene, the amount of methanesulfonic acid was 0.8 g (2504 ppm), 150 g of toluene was additionally added as a solvent, the temperature was set to 120° C., the amount of continuously dripped styrene was 119.4 g (1.1 mol), and 0.7 g of 49 wt % NaOH aqueous solution was used to neutralize. The obtained styrenated polyhydric phenol resin of Synthesis Example 1-3 has a weight of 315 g and an OH equivalent of 166 g/eq.

Synthesis Example 1-4

The preparation procedures of Synthesis Example 1-2 were repeated to prepare the styrenated polyhydric phenol resin of Synthesis Example 1-4, except that in the modification of polyhydric phenol resin with styrene, the amount of methanesulfonic acid was 0.4 g (982 ppm), the amount of continuously dripped styrene was 207.5 g (2.0 mol), and 7 g of 5 wt % NaHCO$_3$ aqueous solution was used to neutralize. The obtained styrenated polyhydric phenol resin of Synthesis Example 1-4 has a weight of 401 g and an OH equivalent of 212 g/eq.

Synthesis Example 1-5

The preparation procedures of Synthesis Example 1-2 were repeated to prepare the styrenated polyhydric phenol resin of Synthesis Example 1-5, except that in the modification of polyhydric phenol resin with styrene, the amount of methanesulfonic acid was 0.4 g (891 ppm), the amount of continuously dripped styrene was 249 g (2.4 mol), and 7 g of 5 wt % NaHCO$_3$ aqueous solution was used to neutralize. The obtained styrenated polyhydric phenol resin of Synthesis Example 1-5 has a weight of 442 g and an OH equivalent of 234 g/eq.

Synthesis Example 1-6

The preparation procedures of Synthesis Example 1-2 were repeated to prepare the styrenated polyhydric phenol resin of Synthesis Example 1-6, except that in the modification of polyhydric phenol resin with styrene, the amount of methanesulfonic acid was 0.9 g (1700 ppm), the amount of continuously dripped styrene was 311.3 g (3.0 mol), and 15.2 g of 5 wt % NaHCO$_3$ aqueous solution was used to neutralize. The obtained styrenated polyhydric phenol resin of Synthesis Example 1-6 has a weight of 504 g and an OH equivalent of 266 g/eq.

Synthesis Example 1-7

The preparation procedures of Synthesis Example 1-2 were repeated to prepare the styrenated polyhydric phenol resin of Synthesis Example 1-7, except that in the modification of polyhydric phenol resin with styrene, the amount of methanesulfonic acid was 1.5 g (2500 ppm), the temperature was set to 100° C., the amount of continuously dripped styrene was 400 g (3.8 mol), and 1.3 g of 49 wt % NaOH aqueous solution was used to neutralize. The obtained styrenated polyhydric phenol resin of Synthesis Example 1-7 has a weight of 588 g and an OH equivalent of 309 g/eq.

Synthesis Example 1-8

The preparation procedures of Synthesis Example 1-2 were repeated to prepare the styrenated polyhydric phenol resin of Synthesis Example 1-8, except that in the modification of polyhydric phenol resin with styrene, methanesulfonic acid was replaced with 2.4 g (6950 ppm) of p-toluenesulfonic acid monohydrate, 10 g of water was additionally added as a solvent, the temperature was set to 85° C., the amount of continuously dripped styrene was 145.3 g (1.4 mol), and 1 g of 49 wt % NaOH aqueous solution was used to neutralize. The obtained styrenated polyhydric phenol resin of Synthesis Example 1-8 has a weight of 339 g and an OH equivalent of 178 g/eq.

Synthesis Example 1-9

The preparation procedures of Synthesis Example 1-2 were repeated to prepare the styrenated polyhydric phenol resin of Synthesis Example 1-9, except that in the modification of polyhydric phenol resin with styrene, methanesulfonic acid was replaced with 1 g (2896 ppm) of p-toluenesulfonic acid monohydrate, 40 g of isopropyl ethanoate was additionally added as a solvent, the temperature was set to 120° C., the amount of continuously dripped styrene was 145.3 g (1.4 mol), and 0.4 g of 49 wt % NaOH aqueous solution was used to neutralize. The obtained styrenated polyhydric phenol resin of Synthesis Example 1-9 has a weight of 340 g and an OH equivalent of 178 g/eq.

Comparative Synthesis Example 1-1

400 g of styrenated monophenol (purity: 96%, OH equivalent: 201 g/eq), 58.7 g of 92 wt % polyoxymethylene and 12 g of water were put into a 1 (one) liter four-necked glass reaction kettle, and the temperature was set to 80° C. After 13.7 g of 10 wt % p-toluenesulfonic acid aqueous solution was continuously dripped into the four-necked glass reaction kettle within 30 minutes, the reaction was carried out at 95° C. to 100° C. for 4 hours. Afterwards, 3 g of 10 wt % NaOH aqueous solution was added to neutralize, 1.8 g of 10 wt % of oxalic acid aqueous solution was added and the temperature was raised to 165° C. to remove water. Next, the temperature was raised to 170° C. under 5 mmHg to obtain 421 g of the styrenated polyhydric phenol resin of Comparative Synthesis Example 1-1 (OH equivalent: 232 g/eq).

Comparative Synthesis Example 1-2

105 g of polyhydric phenol (model: PF-5080, OH equivalent: 105 g/eq, 1.0 mol, available from Chang Chun Plastics), 5.3 g of toluene and 0.078 g (299 ppm) of p-toluenesulfonic acid monohydrate were put into a 1 (one) liter four-necked glass reaction kettle, and the temperature was set to 100° C. After 156.0 g of styrene (1.5 mol) was continuously dripped into the four-necked glass reaction kettle within 3 hours and the reaction was performed for 2 hours, 0.071 g of 30 wt % $Na_2CO_3$ aqueous solution was added to neutralize. Next, the mixture in the reaction kettle was dissolved in 485 g of methyl isobutyl ketone and then washed with water at 80° C. for 5 times. Afterwards, reduced pressure distillation was performed under an absolute pressure of 5 mmHg to remove solvent to obtain 248 g of the styrenated polyhydric phenol resin of Comparative Synthesis Example 1-2 (OH equivalent: 261 g/eq).

Comparative Synthesis Example 1-3

The preparation procedures of Comparative Synthesis Example 1-2 were repeated to prepare the styrenated polyhydric phenol resin of Comparative Synthesis Example 1-3, except that the amount of p-toluenesulfonic acid monohydrate was 0.047 g (299 ppm), the amount of styrene was 52 g (0.5 mol), and the amount of $Na_2CO_3$ aqueous solution was 0.043 g. The obtained styrenated polyhydric phenol resin of Comparative Synthesis Example 1-3 has a weight of 154 g and an OH equivalent of 157 g/eq.

Comparative Synthesis Example 1-4

The preparation procedures of Comparative Synthesis Example 1-2 were repeated to prepare the styrenated polyhydric phenol resin of Comparative Synthesis Example 1-4, except that p-toluenesulfonic acid monohydrate was replaced with 0.551 g (1500 ppm) of methanesulfonic acid, the amount of styrene was 262 g (2.5 mol), and the amount of $Na_2CO_3$ aqueous solution was 0.5 g. The obtained styrenated polyhydric phenol resin of Comparative Synthesis Example 1-4 has a weight of 361 g and an OH equivalent of 367 g/eq.

Comparative Synthesis Example 1-5

The preparation procedures of Comparative Synthesis Example 1-2 were repeated to prepare the styrenated polyhydric phenol resin of Comparative Synthesis Example 1-4, except that polyhydric phenol PF-5080 was replaced with 200 g of polyhydric phenol of Synthesis Example 1-2 (OH equivalent: 103 g/eq, 1.9 mol), p-toluenesulfonic acid monohydrate was replaced with 0.25 g (962 ppm) of methanesulfonic acid, the amount of styrene was 60 g (0.6 mol), and the amount of $Na_2CO_3$ aqueous solution was 0.235 g. The obtained styrenated polyhydric phenol resin of Comparative Synthesis Example 1-5 has a weight of 254 g and an OH equivalent of 135 g/eq.

The properties of the styrenated polyhydric phenol resin of Synthesis Examples 1-1 to 1-9 and Comparative Synthesis Examples 1-1 to 1-5, including hydroxyl equivalent, softening point, the area percentage of the chromatographic peak of the first component at the corresponding retention time in the HPLC spectrum, and the A/B value in the $^{13}$C-NMR spectrum, were measured according to the aforementioned measuring methods. The results are listed in Table 1.

TABLE 1

Properties of the styrenated polyhydric phenol resins of Synthesis Examples 1-1 to 1-9 and Comparative Synthesis Examples 1-1 to 1-5

| Unit | | Hydroxyl equivalent g/eq | Softening point ° C. | Area percentage of the chromatographic peak of the first component in HPLC | A/B value in $^{13}$C-NMR |
|---|---|---|---|---|---|
| Synthesis Example | 1-1 | 209 | 48.5 | 9.0% | 0.89 |
| | 1-2 | 156 | 40.1 | 1.8% | 2.01 |
| | 1-3 | 166 | 42.3 | 1.4% | 1.65 |
| | 1-4 | 212 | 50.2 | 3.8% | 1.05 |
| | 1-5 | 234 | 53.3 | 5.3% | 0.98 |
| | 1-6 | 266 | 58.4 | 12.9% | 0.91 |
| | 1-7 | 309 | 64.5 | 19.3% | 0.75 |
| | 1-8 | 178 | 46.2 | 2.8% | 1.09 |
| | 1-9 | 178 | 44.7 | 2.3% | 1.18 |
| Comparative Synthesis Example | 1-1 | 232 | 88.9 | 27.1% | 0.90 |
| | 1-2 | 261 | 83.0 | 31.8% | 1.95 |
| | 1-3 | 157 | 71.2 | 21.2% | 3.11 |
| | 1-4 | 367 | 89.5 | 33.4% | 0.42 |
| | 1-5 | 135 | 38.3 | 0.8% | 3.25 |

5.3. Synthesis of Glycidyl Ether of Styrenated Polyhydric Phenol Resin

Synthesis Example 2-1

First, a 3 liter four-necked glass reaction kettle was equipped with a condensing oil-water separating tube, a vacuum device, a feeding tube and an electric stirring bar, and the reaction kettle is wrapped with a constant temperature electric heating pack. Then, 300 g (1.46 mol) of the styrenated polyhydric phenol resin of Synthesis Example 1-1, 550 g (5.94 mol) of epichlorohydrin (available from TRIPLEX CHEMICAL CORP.) and 179 g of isopropyl acetate were put into the reaction kettle and mixed under normal pressure to obtain a homogeneous solution. Afterwards, the temperature was raised to 70° C. under an absolute pressure of 190 mmHg, 117.0 g of 49 wt % NaOH aqueous solution was dripped into the homogeneous solution, and temperature was maintained at 70° C. for 7 hours. After the reaction was completed, reduced pressure distillation was performed under an absolute pressure of 20 mmHg and the temperature was raised to 170° C. to recover unreacted epichlorohydrin and isopropyl acetate. Then, toluene and pure water were added to perform washing, and the indissoluble hydrolysate in the delamination between oil and water was visually checked and recorded. After washing three times, reduced pressure distillation was performed under an absolute pressure of 20 mmHg and 170° C. to remove the solvent of the organic phase to obtain 370 g of the glycidyl ether of styrenated polyhydric phenol resin of Synthesis Example 2-1.

Synthesis Example 2-2

The preparation procedures of Synthesis Example 2-1 were repeated to prepare the glycidyl ether of styrenated polyhydric phenol resin of Synthesis Example 2-2, except that 300 g (1.93 mol) of the styrenated polyhydric phenol resin of Synthesis Example 1-2, 816.6 g (8.83 mol) of epichlorohydrin, and 152 g of 49 wt % NaOH aqueous solution were used. The obtained glycidyl ether of styrenated polyhydric phenol resin of Synthesis Example 2-2 has a weight of 396 g.

Synthesis Example 2-3

The preparation procedures of Synthesis Example 2-1 were repeated to prepare the glycidyl ether of styrenated polyhydric phenol resin of Synthesis Example 2-3, except that 300 g (1.83 mol) of the styrenated polyhydric phenol resin of Synthesis Example 1-3, 510 g (5.51 mol) of epichlorohydrin, and 145 g of 49 wt % NaOH aqueous solution were used. The obtained glycidyl ether of styrenated polyhydric phenol resin of Synthesis Example 2-3 has a weight of 390 g.

Synthesis Example 2-4

The preparation procedures of Synthesis Example 2-1 were repeated to prepare the glycidyl ether of styrenated polyhydric phenol resin of Synthesis Example 2-4, except that 300 g (0.97 mol) of the styrenated polyhydric phenol resin of Synthesis Example 1-7, 850 g (9.19 mol) of epichlorohydrin, and 77 g of 49 wt % NaOH aqueous solution were used. The obtained glycidyl ether of styrenated polyhydric phenol resin of Synthesis Example 2-4 has a weight of 343 g.

Synthesis Example 2-5

The preparation procedures of Synthesis Example 2-1 were repeated to prepare the glycidyl ether of styrenated polyhydric phenol resin of Synthesis Example 2-5, except that 300 g (1.69 mol) of the styrenated polyhydric phenol resin of Synthesis Example 1-8, 816.6 g (8.83 mol) of epichlorohydrin, and 133 g of 49 wt % NaOH aqueous solution were used while isopropyl acetate was not used. The obtained glycidyl ether of styrenated polyhydric phenol resin of Synthesis Example 2-5 has a weight of 382 g.

Synthesis Example 2-6

First, a 3 liter four-necked reactor was prepared and equipped with the following devices: a device for controlling and displaying temperature and pressure, and a device for condensing a co-distillation mixture of water and epichlorohydrin and separating the co-distillation mixture into an organic phase and a water phase. 300 g (1.69 mol) of the styrenated polyhydric phenol resin of Synthesis Example 1-9, 816.6 g (8.83 mol) of epichlorohydrin and 2.7 g (9,000 ppm with respect to the polyhydric phenol resin) of benzyl triethyl ammonium chloride as a coupling agent were added into the reactor to obtain a mixture, and the mixture was stirred under normal pressure and 40° C. to form a homogeneous solution. Next, the temperature was raised from 40° C. to 75° C. within 50 hours and maintained at 75° C. for 16 hours. Afterwards, a dehydrohalogenation step was performed, wherein 133 g of 49 wt % NaOH aqueous solution was added into the mixture at a constant rate under 60° C. within 6 hours; in the meantime, water contained in the reaction system was subjected to azeotropic distillation and condensation at an absolute pressure of 100 torr. The condensed azeotrope was separated into an organic phase and a water phase, and the organic phase (mainly epichlorohydrin) was recovered back to the reactor while the water phase was discarded. After the addition of NaOH aqueous solution was completed, the reaction system was maintained for 1 (one) hour to accomplish the dehydrohalogenation step. The unreacted epichlorohydrin was removed by reduced pressure distillation under an absolute pressure of 20 mmHg and 170° C. The dehydrohalogenation step was repeated, except that 4.0 g of 49 wt % NaOH aqueous solution was added into the mixture under 80° C. and normal pressure within 2 hours. Next, sodium chloride contained in the obtained crude product was dissolved in toluene and ionized water and washed by water. The organic solvent was removed from the obtained mixture by reduced pressure distillation under an absolute pressure of 20 mmHg and 170° C. to obtain 381 g of glycidyl ether of styrenated polyhydric phenol resin of Synthesis Example 2-6.

Comparative Synthesis Example 2-1

The preparation procedures of Synthesis Example 2-1 were repeated to prepare the glycidyl ether of styrenated polyhydric phenol resin of Comparative Synthesis Example 2-1, except that 300 g (1.29 mol) of the styrenated polyhydric phenol resin of Comparative Synthesis Example 1-1, 418.7 g (4.53 mol) of epichlorohydrin, and 103 g of 49 wt % NaOH aqueous solution were used. The obtained glycidyl ether of styrenated polyhydric phenol resin of Comparative Synthesis Example 2-1 has a weight of 361 g.

Comparative Synthesis Example 2-2

The preparation procedures of Synthesis Example 2-1 were repeated to prepare the glycidyl ether of styrenated polyhydric phenol resin of Comparative Synthesis Example 2-2, except that 300 g (1.91 mol) of the styrenated polyhydric phenol resin of Comparative Synthesis Example 1-3, 819 g (8.85 mol) of epichlorohydrin, and 153 g of 49 wt % NaOH aqueous solution were used. The obtained glycidyl ether of styrenated polyhydric phenol resin of Comparative Synthesis Example 2-2 has a weight of 394 g.

Comparative Synthesis Example 2-3

The preparation procedures of Synthesis Example 2-1 were repeated to prepare the glycidyl ether of styrenated polyhydric phenol resin of Comparative Synthesis Example 2-3, except that 300 g (0.82 mol) of the styrenated polyhydric phenol resin of Comparative Synthesis Example 1-4, 343.8 g (3.72 mol) of epichlorohydrin, and 65.5 g of 49 wt % NaOH aqueous solution were used. The obtained glycidyl ether of styrenated polyhydric phenol resin of Comparative Synthesis Example 2-3 has a weight of 335 g.

Comparative Synthesis Example 2-4

The preparation procedures of Synthesis Example 2-1 were repeated to prepare the glycidyl ether of styrenated polyhydric phenol resin of Comparative Synthesis Example 2-4, except that 300 g (2.24 mol) of the styrenated polyhydric phenol resin of Comparative Synthesis Example 1-5, 809 g (8.74 mol) of epichlorohydrin, and 179 g of 49 wt % NaOH aqueous solution were used. The obtained glycidyl ether of styrenated polyhydric phenol resin of Comparative Synthesis Example 2-4 has a weight of 412 g.

The properties of the glycidyl ether of styrenated polyhydric phenol resin of Synthesis Examples 2-1 to 2-6 and Comparative Synthesis Examples 2-1 to 2-4, including epoxy equivalent weight (EEW), hydrolyzable chlorine (HyCl) content, hydroxyl value (HV), α-glycol content, Gardner Color Scale, the area percentage of the chromatographic peak of the first component at the corresponding retention time in the HPLC spectrum, and A/B value in the $^{13}$C-NMR spectrum, were measured according to the aforementioned measuring methods. The results are listed in Table 2.

5.4. Preparation of Copper-Clad Laminate

Example 1

First, 240 g of the glycidyl ether of styrenated polyhydric phenol resin of Synthesis Example 2-1, 97 g of dicyandiamide diluent (dicyandiamide dissolved in methanol, concentration: 10 wt %, available from Juyi Chemical), 1.64 g of 2-methylimidazole diluent (2-methylimidazole dissolved in methanol, concentration: 10 wt %, available from Juyi Chemical) and 60 g of acetone were mixed using a stirrer to form a resin composition. Glass fiber cloths (model no.: GF-7628, thickness: 0.175 cm) were immersed in the aforementioned resin composition and dried under 160° C. to form a prepreg. Afterwards, 5 pieces of the prepregs were superimposed, and two sheets of copper foils (35 μm) were superimposed respectively on the two external surfaces of the superimposed prepregs. Then, a high-temperature hot-pressing curing operation was performed on the superimposed prepregs under 210° C. and 25 kg/cm$^2$ to obtain the copper-clad laminate of Example 1.

Example 2

The preparation procedures of Example 1 were repeated to prepare the copper-clad laminate of Example 2, except that the resin composition was formed by using 240 g of the glycidyl ether of styrenated polyhydric phenol resin of Synthesis Example 2-2, 114 g of dicyandiamide diluent (dicyandiamide dissolved in methanol, concentration: 10 wt %), 1.75 g of 2-methylimidazole diluent (2-methylimidazole dissolved in methanol, concentration: 10 wt %) and 60 g of acetone.

Example 3

The preparation procedures of Example 1 were repeated to prepare the copper-clad laminate of Example 3, except that the resin composition was formed by using 240 g of the glycidyl ether of styrenated polyhydric phenol resin of Synthesis Example 2-4, 75 g of dicyandiamide diluent (dicyandiamide dissolved in methanol, concentration: 10 wt

TABLE 2

Properties of the glycidyl ether of styrenated polyhydric phenol resins of Synthesis Examples 2-1 to 2-6 and Comparative Synthesis Examples 2-1 to 2-4

| | | EEW | HyCl | HV | α-glycol content | Gardner Color | Area percentage of the chromatographic peak of the | A/B value in |
|---|---|---|---|---|---|---|---|---|
| Unit | | g/eq | ppm | eq/100 g | meq/g | Scale | first component in HPLC | $^{13}$C-NMR |
| Synthesis Example | 2-1 | 285.9 | 291 | 0.091 | 0.009 | 8.5 | 9.8 | 0.93 |
| | 2-2 | 241.4 | 114 | 0.065 | 0.007 | 10.3 | 2.1 | 2.39 |
| | 2-3 | 255.3 | 213 | 0.089 | 0.014 | 14.1 | 1.3 | 1.72 |
| | 2-4 | 372.1 | 265 | 0.098 | 0.004 | 9.1 | 18.9 | 0.79 |
| | 2-5 | 246.5 | 147 | 0.078 | 0.012 | 12.1 | 3.1 | 1.12 |
| | 2-6 | 239.4 | 174 | 0.041 | 0.006 | 13.9 | 3.8 | 1.23 |
| Comparative Synthesis Example | 2-1 | 367.3 | 275 | 0.068 | 0.017 | 13.8 | 25.4 | 0.93 |
| | 2-2 | 238.2 | 333 | 0.079 | 0.010 | 14.5 | 20.8 | 3.09 |
| | 2-3 | 449.4 | 215 | 0.078 | 0.011 | 14.2 | 31.8 | 0.48 |
| | 2-4 | 203.6 | 308 | 0.081 | 0.015 | 13.8 | 0.9 | 3.3 |

%), 1.55 g of 2-methylimidazole diluent (2-methylimidazole dissolved in methanol, concentration: 10 wt %) and 60 g of acetone.

Example 4

The preparation procedures of Example 1 were repeated to prepare the copper-clad laminate of Example 4, except that the resin composition was formed by using 240 g of the glycidyl ether of styrenated polyhydric phenol resin of Synthesis Example 2-6, 115 g of dicyandiamide diluent (dicyandiamide dissolved in methanol, concentration: 10 wt %), 1.74 g of 2-methylimidazole diluent (2-methylimidazole dissolved in methanol, concentration: 10 wt %) and 60 g of acetone.

Comparative Example 1

The preparation procedures of Example 1 were repeated to prepare the copper-clad laminate of Comparative Example 1, except that the resin composition was formed by using 240 g of the glycidyl ether of styrenated polyhydric phenol resin of Comparative Synthesis Example 2-1, 100 g of dicyandiamide diluent (dicyandiamide dissolved in methanol, concentration: 10 wt %), 1.65 g of 2-methylimidazole diluent (2-methylimidazole dissolved in methanol, concentration: 10 wt %) and 60 g of acetone.

Comparative Example 2

The preparation procedures of Example 1 were repeated to prepare the copper-clad laminate of Comparative Example 2, except that the resin composition was formed by using 240 g of the glycidyl ether of styrenated polyhydric phenol resin of Comparative Synthesis Example 2-2, 117 g of dicyandiamide diluent (dicyandiamide dissolved in methanol, concentration: 10 wt %), 1.73 g of 2-methylimidazole diluent (2-methylimidazole dissolved in methanol, concentration: 10 wt %) and 60 g of acetone.

Comparative Example 3

The preparation procedures of Example 1 were repeated to prepare the copper-clad laminate of Comparative Example 3, except that the resin composition was formed by using 240 g of the glycidyl ether of styrenated polyhydric phenol resin of Comparative Synthesis Example 2-3, 62 g of dicyandiamide diluent (dicyandiamide dissolved in methanol, concentration: 10 wt %), 1.52 g of 2-methylimidazole diluent (2-methylimidazole dissolved in methanol, concentration: 10 wt %) and 60 g of acetone.

Comparative Example 4

The preparation procedures of Example 1 were repeated to prepare the copper-clad laminate of Comparative Example 4, except that the resin composition was formed by using 240 g of the glycidyl ether of styrenated polyhydric phenol resin of Comparative Synthesis Example 2-4, 134 g of dicyandiamide diluent (dicyandiamide dissolved in methanol, concentration: 10 wt %), 1.82 g of 2-methylimidazole diluent (2-methylimidazole dissolved in methanol, concentration: 10 wt %) and 60 g of acetone.

The properties of the copper-clad laminate of Examples 1 to 4 and Comparative Examples 1 to 4, including 288° C. floating solder test, peeling strength, flame retardance, water absorption, Td, Tg, CTE-$\alpha$1 and CTE-$\alpha$2, were measured according to the aforementioned testing methods. The results are listed in Table 3.

TABLE 3

Properties of copper-clad laminates of Examples 1 to 4 and Comparative Examples 1 to 4

| | | 288° C. floating solder | Peeling strength | Flame retardance | Water absorption | Td | Tg | CTE-$\alpha$1 | CTE-$\alpha$2 |
|---|---|---|---|---|---|---|---|---|---|
| Unit | | | kgf/cm | second | | ° C. | ° C. | ppm/° C. | ppm/° C. |
| Example | 1 | Passed | 1.64 | 36 | 0.31% | 364.6 | 119 | 13.7 | 169.8 |
| | 2 | Passed | 1.82 | 38 | 0.33% | 359.7 | 125 | 14.8 | 166.5 |
| | 3 | Passed | 1.55 | 34 | 0.29% | 366.4 | 118 | 13.2 | 171.2 |
| | 4 | Passed | 1.79 | 35 | 0.32% | 363.2 | 121 | 13.9 | 168.3 |
| Comparative Example | 1 | Failed | 1.53 | 49 | 0.31% | 352.2 | 120 | 15.3 | 182.5 |
| | 2 | Passed | 1.78 | 45 | 0.38% | 355.8 | 124 | 16.4 | 179.9 |
| | 3 | Failed | 1.11 | 51 | 0.29% | 351.9 | 114 | 14.5 | 194.5 |
| | 4 | Passed | 1.9 | 52 | 0.38% | 348.3 | 132 | 18.5 | 161.2 |

As shown in Table 3, the copper-clad laminates prepared from the glycidyl ethers of polyhydric phenol resin of the present invention can pass the 288° C. floating solder test, and have good physicochemical properties (e.g., high peeling strength, high flame retardance, high Td, high Tg, and the like), especially low water absorption and low CTE. By contrast, as shown in Comparative Examples 1 to 4, when the area percentage of the chromatographic peak of the first component at the corresponding retention time in the HPLC spectrum falls outside the designated range, the prepared copper-clad laminates prepared cannot pass the 288° C. floating solder test or do not have good physicochemical properties, especially in terms of water absorption and CTE. Thus, the copper-clad laminates of Comparative Examples 1 to 4 cannot provide the desired efficacy of the present invention.

5.5. Preparation of High-Frequency Adhesive

Example 5

First, 25 g of toluene as a solvent and 35 g of polytetrafluoroethylene (model no.: POLYFLON PTFE L-5, available from DAIKIN CHEMICAL) were mixed and stirred for 30 minutes using a stirrer to obtain a uniform slurry. Next, 60 g of polyimide (model no.: PIAD200, available from ARAKAWA CHEMICAL) and 5 g of the glycidyl ether of styrenated polyhydric phenol resin of Synthesis Example 2-1 were added into the slurry and stirred for 30 minutes using a stirrer to obtain a uniform resin slurry. The resin slurry was homogenized by using a high-speed homogenizer at 3000 rpm for 30 minutes to make the appearance uniform without granules. 0.77 g of dicyandiamide diluent (dicyandiamide dissolved in dimethylacetamide, concentration: 20 wt %) as a hardener and 0.206 g of 2-methylimidazole diluent (2-methylimidazole dissolved in dimethylacetamide, concentration: 15 wt %) as a hardening promoter were added into the homogenized resin slurry and stirred for 15 minutes to obtain a coating composition. After the coating composition was coated onto a release polyethylene terephthalate (PET) film by using an automatic coating machine with a gap of 125 μm, the coated film was baked in an oven at 140° C. for 3 minutes and then cooled to obtain a semi-cured (B-stage) high-frequency adhesive film of Example 5.

Example 6

The preparation procedures of Example 5 were repeated to prepare the high-frequency adhesive of Example 6, except that 5 g of the glycidyl ether of styrenated polyhydric phenol resin of Synthesis Example 2-2, 0.91 g of the hardener and 0.244 g of the hardening promoter were used.

Example 7

The preparation procedures of Example 5 were repeated to prepare the high-frequency adhesive of Example 7, except that 5 g of the glycidyl ether of styrenated polyhydric phenol resin of Synthesis Example 2-4, 0.59 g of the hardener and 0.158 g of the hardening promoter were used.

Example 8

The preparation procedures of Example 5 were repeated to prepare the high-frequency adhesive of Example 8, except that 5 g of the glycidyl ether of styrenated polyhydric phenol resin of Synthesis Example 2-6, 0.92 g of the hardener and 0.246 g of the hardening promoter were used.

Comparative Example 5

The preparation procedures of Example 5 were repeated to prepare the high-frequency adhesive of Comparative Example 5, except that 5 g of the glycidyl ether of styrenated polyhydric phenol resin of Comparative Synthesis Example 2-1, 0.6 g of the hardener and 0.16 g of the hardening promoter were used.

Comparative Example 6

The preparation procedures of Example 5 were repeated to prepare the high-frequency adhesive of Comparative Example 6, except that 5 g of the glycidyl ether of styrenated polyhydric phenol resin of Comparative Synthesis Example 2-2, 0.93 g of the hardener and 0.247 g of the hardening promoter were used.

Comparative Example 7

The preparation procedures of Example 5 were repeated to prepare the high-frequency adhesive of Comparative Example 7, except that 5 g of the glycidyl ether of styrenated polyhydric phenol resin of Comparative Synthesis Example 2-3, 0.49 g of the hardener and 0.1311 g of the hardening promoter were used.

Comparative Example 8

The preparation procedures of Example 5 were repeated to prepare the high-frequency adhesive of Comparative Example 8, except that 5 g of the glycidyl ether of styrenated polyhydric phenol resin of Comparative Synthesis Example 2-4, 1.08 g of the hardener and 0.289 g of the hardening promoter were used.

The properties of the high-frequency adhesive of Examples 5 to 8 and Comparative Examples 5 to 8, including 288° C. floating solder test, peeling strength, Dk and Df, were measured according to the aforementioned testing methods. The results are listed in Table 4.

TABLE 4

Properties of high-frequency adhesives of Examples 5 to 8 and Comparative Examples 5 to 8

| Unit | | 288° C. floating solder | Peeling strength kgf/cm | Dk @ 10 GHz | Df @ 10 GHz |
|---|---|---|---|---|---|
| Example | 5 | Passed | 1.19 | 2.21 | 0.0031 |
| | 6 | Passed | 1.25 | 2.23 | 0.0032 |
| | 7 | Passed | 1.18 | 2.20 | 0.0030 |
| | 8 | Passed | 1.23 | 2.21 | 0.0032 |
| Comparative Example | 5 | Failed | 1.19 | 2.21 | 0.0031 |
| | 6 | Passed | 1.20 | 2.28 | 0.0035 |
| | 7 | Failed | 0.98 | 2.20 | 0.0031 |
| | 8 | Passed | 1.29 | 2.29 | 0.0036 |

As shown in Table 4, the high-frequency adhesives prepared from the glycidyl ethers of polyhydric phenol resin of the present invention can pass the 288° C. floating solder test and have excellent peeling strength and dielectric properties (Dk, Df). By contrast, as shown in Comparative Examples 5 to 8, when the area percentage of the chromatographic peak of the first component at the corresponding retention time in the HPLC spectrum falls outside the designated range, the high-frequency adhesives prepared thereby cannot pass the 288° C. floating solder test, or the high-frequency adhesives prepared thereby do not have good physicochemical properties. Thus, the high-frequency adhesives of Comparative Examples 5 to 8 cannot provide the desired efficacy of the present invention.

The above examples are used to illustrate the principle and efficacy of the present invention and show the inventive features thereof but are not used to limit the scope of the present invention. People skilled in this field may proceed with a variety of modifications and replacements based on the disclosures and suggestions of the invention as described. Therefore, the scope of protection of the present invention is that as defined in the claims as appended.

What is claimed is:

1. A polyhydric phenol resin, which comprises a polyhydric phenol resin component and a first component, wherein when the polyhydric phenol resin is characterized by high-performance liquid chromatography (HPLC), the first component is eluted at a retention time ranging from 27.1 minutes to 28.0 minutes, and based on the total area of the chromatographic peaks of the polyhydric phenol resin, the area percentage of the chromatographic peak of the first component at the corresponding retention time in the spectrum ranges from 1.0% to 20.0%, wherein the HPLC analysis is performed under the following conditions: a detector applying 254 nm wavelength ultraviolet light; an octadecylsilane (ODS) column which is 250 mm in length and 4.6 mm in inner diameter and has fillers with a particle size of 5 μm; a column temperature of 40° C.; a detector temperature of 35° C.; a mobile phase flow rate of 1.0 mL/min; a sample which is formulated with acetonitrile (ACN) as a solvent and has a sample concentration of 0.5 wt % in ACN; an injection amount of 15 μL; and a composition of mobile phase as follows: from 0 minutes to the 10$^{th}$ minute of the washing time, the mobile phase is a mixture of 40 vol % of water and 60 vol % of acetonitrile; from the 10$^{th}$ minute to the 30$^{th}$ minute of the washing time, the mobile phase changes from a mixture of 40 vol % of water and 60 vol % of acetonitrile to 100 vol % of acetonitrile in a linear gradient manner with respect to time, and from the 30$^{th}$ minute to the 50$^{th}$ minute of the washing time, the mobile phase is 100 vol % of acetonitrile, wherein when the polyhydric phenol resin is characterized by gas chromatography-mass spectrometry (GC-MS), the first component is eluted at a retention time ranging from 18.000 minutes to 21.000 minutes, and a fragmentation pattern of the first component comprises one or more signals at a mass-to-charge ratio (m/z) selected from the group consisting of 51, 65, 77, 89, 91, 115, 130, 165, 178, 193, and 208.

2. The polyhydric phenol resin of claim 1, wherein when the polyhydric phenol resin is characterized by carbon-13 nuclear magnetic resonance ($^{13}$C-NMR), the "C-NMR spectrum of the polyhydric phenol resin has an integral value A of signals from 145 ppm to 160 ppm and an integral value B of signals from 28 ppm to 38 ppm, and the ratio of A to B (A/B) ranges from 0.5 to 3.0, wherein the solvent used in the $^{13}$C-NMR is dimethyl sulfoxide, and the reference substance used in the $^{13}$C-NMR is tetramethylsilane.

3. The polyhydric phenol resin of claim 1, wherein the polyhydric phenol resin is styrenated polyhydric phenol resin.

4. The polyhydric phenol resin of claim 1, wherein the polyhydric phenol resin has a hydroxyl equivalent weight ranging from 150 g/eq to 320 g/eq.

5. The polyhydric phenol resin of claim 1, wherein the softening point temperature of the polyhydric phenol resin ranges from 30° C. to 70° C., wherein the softening point temperature is measured in accordance with JIS K 2207 ring and ball method.

6. A glycidyl ether of polyhydric phenol resin, which comprises a component of glycidyl ether of polyhydric phenol resin and a first component, wherein:

when the glycidyl ether of polyhydric phenol resin is characterized by high-performance liquid chromatography (HPLC), the first component is eluted at a retention time ranging from 27.1 minutes to 28.0 minutes, and based on the total area of the chromatographic peaks of the glycidyl ether of polyhydric phenol resin, the area percentage of the chromatographic peak of the first component at the corresponding retention time in the spectrum ranges from 1.0% to 20.0%, wherein the HPLC analysis is performed under the following conditions: a detector applying 254 nm wavelength ultraviolet light; an octadecylsilane (ODS) column which is 250 mm in length and 4.6 mm in inner diameter and has fillers with a particle size of 5 μm; a column temperature of 40° C.; a detector temperature of 35° C.; a mobile phase flow rate of 1.0 mL/min; a sample which is formulated with acetonitrile (ACN) as a solvent and has a sample concentration of 0.5 wt % in ACN; an injection amount of 15 μL; and a composition of mobile phase as follows: from 0 minutes to the 10$^{th}$ minute of the washing time, the mobile phase is a mixture of 40 vol % of water and 60 vol % of acetonitrile; from the 10$^{th}$ minute to the 30$^{th}$ minute of the washing time, the mobile phase changes from a mixture of 40 vol % of water and 60 vol % of acetonitrile to 100 vol % of acetonitrile in a linear gradient manner with respect to time, and from the 30$^{th}$ minute to the 50$^{th}$ minute of the washing time, the mobile phase is 100 vol % of acetonitrile, wherein when the glycidyl ether of polyhydric phenol resin is characterized by gas chromatography-mass spectrometry (GC-MS), the first component is eluted at a retention time ranging from 18.000 minutes to 21.000 minutes, and a fragmentation pattern of the first component comprises one or more signals at a mass-to-charge ratio (m/z) selected from the group consisting of 51, 65, 77, 89, 91, 115, 130, 165, 178, 193, and 208.

7. The glycidyl ether of polyhydric phenol resin of claim 6, wherein when the glycidyl ether of polyhydric phenol resin is characterized by carbon-13 nuclear magnetic resonance ($^{13}$C-NMR), the $^{13}$C-NMR spectrum of the glycidyl ether of polyhydric phenol resin has an integral value A of signals from 145 ppm to 160 ppm and an integral value B of signals from 28 ppm to 38 ppm, the ratio of A to B (AB) ranges from 0.5 to 3.0, wherein the solvent used in the $^{13}$C-NMR is dimethyl sulfoxide, and the reference substance used in the $^{13}$C-NMR is tetramethylsilane.

8. The glycidyl ether of polyhydric phenol resin of claim 6, wherein the glycidyl ether of polyhydric phenol resin is glycidyl ether of styrenated polyhydric phenol resin.

9. The glycidyl ether of polyhydric phenol resin of claim 6, wherein the glycidyl ether of polyhydric phenol resin has an epoxy equivalent weight (EEW) ranging from 200 g/eq to 400 g/eq.

10. The glycidyl ether of polyhydric phenol resin of claim 6, wherein the glycidyl ether of polyhydric phenol resin comprises 300 ppm or less of hydrolyzable chlorine (HyCl).

11. The glycidyl ether of polyhydric phenol resin of claim 6, wherein the glycidyl ether of polyhydric phenol resin has a hydroxyl value (HV) ranging from 0.040 eq/100 g to 0.10 eq/100 g.

12. The glycidyl ether of polyhydric phenol resin of claim 6, wherein the glycidyl ether of polyhydric phenol resin comprises 0.003 meq/g to 0.015 meq/g of a-glycol.

13. A curable composition, which comprises (a1) the glycidyl ether of polyhydric phenol resin of claim 6, and (b1) a hardener.

14. A copper-clad laminate, which comprises: (a2) a dielectric layer, which comprises a dielectric material obtained by curing the curable composition of claim 13; and (b2) a copper foil, which is disposed on the surface of the dielectric layer.

15. A curable composition, which comprises (a1) the glycidyl ether of polyhydric phenol resin of claim 7, and (b1) a hardener.

16. A copper-clad laminate, which comprises: (a2) a dielectric layer, which comprises a dielectric material obtained by curing the curable composition of claim 15; and (b2) a copper foil, which is disposed on the surface of the dielectric layer.

17. A curable composition, which comprises (a1) the glycidyl ether of polyhydric phenol resin of claim 8, and (b1) a hardener.

18. A copper-clad laminate, which comprises: (a2) a dielectric layer, which comprises a dielectric material obtained by curing the curable composition of claim 17; and (b2) a copper foil, which is disposed on the surface of the dielectric layer.

* * * * *